(12) United States Patent
Napoles et al.

(10) Patent No.: US 10,201,173 B1
(45) Date of Patent: *Feb. 12, 2019

(54) CIRCULATION CHAMBER AND METHOD OF USING SAME

(71) Applicants: Alexander Alfred Napoles, Miami, FL (US); Alexander Elias Napoles, Miami, FL (US)

(72) Inventors: Alexander Alfred Napoles, Miami, FL (US); Alexander Elias Napoles, Miami, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 15/819,245

(22) Filed: Nov. 21, 2017

Related U.S. Application Data

(63) Continuation-in-part of application No. 14/254,635, filed on Apr. 16, 2014, now Pat. No. 9,821,952.

(51) Int. Cl.
| | |
|---|---|
| A23L 3/3409 | (2006.01) |
| B65D 88/74 | (2006.01) |
| B67D 7/54 | (2010.01) |
| A01M 13/00 | (2006.01) |

(52) U.S. Cl.
CPC ....... A23L 3/34095 (2013.01); A01M 13/003 (2013.01); B65D 88/745 (2013.01); B67D 7/54 (2013.01); B01D 2259/455 (2013.01)

(58) Field of Classification Search
CPC .................................................. B65D 88/745
See application file for complete search history.

(56) References Cited

U.S. PATENT DOCUMENTS

| | | |
|---|---|---|
| 2,703,194 A | 3/1955 | White |
| 3,866,636 A | 2/1975 | Lasater |
| 4,234,926 A | 11/1980 | Wallace et al. |
| 4,966,755 A | 10/1990 | Smith |
| 5,005,786 A | 4/1991 | Okamoto et al. |
| 5,069,260 A | 12/1991 | Shea |
| 5,318,789 A | 6/1994 | Nakagawa et al. |
| 5,565,178 A | 10/1996 | Dove et al. |
| 5,662,865 A | 9/1997 | Blatchford |
| 5,678,352 A | 10/1997 | Leitner et al. |
| 5,975,165 A | 11/1999 | Motosugi et al. |
| 6,047,496 A | 4/2000 | Leitner et al. |
| 6,256,905 B1 | 7/2001 | White |

(Continued)

OTHER PUBLICATIONS

Scheffrahn, Rudolf, H., Expert Report in the Matter of *Structural Tenting Corporation and AI Flex Exterminators Inc* vs. *The Termite Doctor LLC*, Published May 11, 2010, USA.

(Continued)

*Primary Examiner* — Sean E Conley
(74) *Attorney, Agent, or Firm* — Malloy & Malloy, PL

(57) ABSTRACT

A circulation chamber for a cargo container comprises a cargo container extension including a housing, a cargo container aperture, and an interior volume; the cargo container extension is structured and dimensioned to be attached to an opening of the cargo container, thereby placing the interior volume in fluid communication with an interior of the cargo container. The housing, cargo container aperture, and interior volume may be cooperatively structured and dimensioned to allow at least a portion of the cargo container to be disposed in sealing engagement with the cargo container aperture, and furthermore, allow, at least partially, a door of the cargo container to be open while the circulation chamber is attached to the cargo container.

14 Claims, 10 Drawing Sheets

(56) References Cited

U.S. PATENT DOCUMENTS

| | | |
|---|---|---|
| 6,305,148 B1 | 10/2001 | Bowden et al. |
| 6,403,027 B1 | 6/2002 | Napoles et al. |
| 8,132,357 B2 | 3/2012 | Rogacki et al. |
| 8,424,240 B2 | 4/2013 | Rogacki et al. |
| 8,656,635 B1 | 2/2014 | Rogacki et al. |
| 9,821,952 B1 | 11/2017 | Napoles et al. |
| 2005/0279047 A1 | 12/2005 | Kalnay |
| 2007/0190922 A1 | 8/2007 | Fuchs et al. |
| 2008/0106137 A1 | 5/2008 | Paton-Ash et al. |
| 2009/0272024 A1 | 11/2009 | Rogacki et al. |

OTHER PUBLICATIONS

Dow Agrosciences LLC, "Supplemental Labeling,", Reissued Jan. 1, 1998, USA.

Scheffrahn, R.H., "Evaluation of Polymer Film Enclosures as Protective Barriers [ . . . ] Fumigants," J Agric Food Chem 1990, 38, p. 904, published Mar. 1990, USA.

Chemical Manufacturers Association, "Methyl Bromide Emergency Response Manual", Revision 2, Published Mar. 2000, USA.

Great Lakes Chemical Corporation, Fumigation Guide, Great Lakes Chemical Corporation Agricultural Products, Published Apr. 1998, USA.

Great Lakes Chemical Corporation, Directions for Use of the Product: Meth-O-Gas Q Commodity Fumigant or Quarantine/Regulatory Use Only, Published 2005, USA.

Agricultural Products Business Great Lakes Chemical Corporation, Meth-O-Gas Products, Applicator Training Manual, Published Feb. 2000, USA.

Great Lakes Chemical Corporation, Meth-O-Gas Q, Commodity Fumigant for Quarantine/Regulatory Use Only (Specimen Label), Dec. 20, 2006, USA.

U.S. Government, "Chemical Treatments Fumigants Methyl Bromide," PPQ 04/98-01, 1st ed., U.S. Government (USA), p. 2.2.13-48.

CIRCULATION CHAMBER AND METHOD OF USING SAME

CLAIM OF PRIORITY

The present application is a "Continuation-In-Part" patent application and a claim of priority is made to U.S. patent application having Ser. No. 14/254,635, filed on Apr. 16, 2014, which has matured into U.S. Pat. No. 9,821,952 and which is incorporated herein by reference in its entirety.

BACKGROUND OF THE INVENTION

Field of the Invention

The invention is directed to the field of fumigating imported or exported matter such as produce or wood products and more specifically, improvements in the "tarpless" fumigation of same.

Description of the Related Art

United States Federal regulations require that imported fruits, vegetables, and other perishable or organic matter be inspected upon arrival to United States Ports of Entry. Under certain circumstances, an inspector may determine that such perishables must be fumigated before they are allowed to leave United States Customs Quarantine Areas.

The fumigation process, as well as the requirements for packing perishables in containers for fumigation present several problems. First, because fumigation requires circulation, shippers must leave sufficient room in the container for air to circulate. Generally this requires that goods be stacked no higher than eighteen inches from the top of the container, or twenty percent air space, depending on the fumigation method. Because the goods could otherwise be packed to within five inches of the top of the container, this results in less than optimal shipping configurations.

Second, and as stated previously, the fumigation process can present several problems. The standard method of fumigation is known as tenting, whereby a tarpaulin is first draped over the container which must be weighted down or otherwise sealed against the ground to act as a gas barrier. All of the conduits, gas, electrical and other lines must be fed under the tarp. This method inherently utilizes a greater amount of fumigant than would otherwise be necessary to fumigate only the container. Furthermore, the tenting process generally cannot be carried out on a windy day. Lastly, the tenting process exposes the contents of the cargo container to a relatively large amount of ambient air, which is not desirable in the case of a refrigerated container, which must be shut off during the fumigation process.

Other methods of fumigation have sought to eliminate the tarpaulin. One such method of "tarpless" fumigation requires transporting the container to a fixed fumigation site, unloading the contents of the container, fumigating, and reloading the contents of the container. This method is obviously quite time consuming and not desirable in the case of refrigerated perishables. This method further increases the risk of contamination as removing the cargo from the container would substantially increase the opportunity for insects and pests to escape the quarantine.

Another such method of tarpless fumigation involves first opening the doors of the container and placing a second door module in the opening which acts as a seal for the fumigant. This method fails to address the problem with exposure of refrigerated contents to ambient air and furthermore, still requires shippers to comply with the inefficient packing requirement of eighteen inches of head space or twenty percent air space.

The current invention is directed toward a system and method for fumigating a cargo container that allows for more efficient packing of cargo, better preserves the internal temperature of refrigerated containers, and addresses other issues known in the art.

SUMMARY OF THE INVENTION

The invention is directed toward a circulation chamber which can be attached to a standard cargo shipping container. In at least one embodiment, the circulation chamber is dimensioned such that the doors of the cargo container may be opened into the circulation chamber.

In at least one embodiment, the circulation chamber includes a cargo container extension which can be attached to at least one cargo container and provides a volume of air for circulation during fumigation of the contents of the cargo container(s).

In one embodiment, the cargo container extension includes a housing, cargo container aperture, and internal volume. The cargo container aperture is generally structured and dimensioned to be attached to a cargo container, thereby placing the internal volume in fluid communication with the interior of the cargo container.

In another embodiment, the circulation chamber includes an access port, structured, dimensioned, and configured to allow egress and ingress of an operator into the circulation chamber, while preventing refrigerated air or contaminants and pests from escaping therefrom. The circulation chamber may also include at least one equipment port, for the introduction of a one or more lines and other equipment to the circulation chamber.

The invention is also directed toward a method of fumigating a cargo container utilizing a circulation chamber. In at least one embodiment the method includes the steps of attaching the circulation chamber before opening a door of the cargo container.

Yet another embodiment of the method includes allowing a refrigeration system attached to the cargo container to run during fumigation.

A further embodiment of the method includes utilizing the refrigeration system to facilitate the circulation within the cargo container after the fumigation step.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
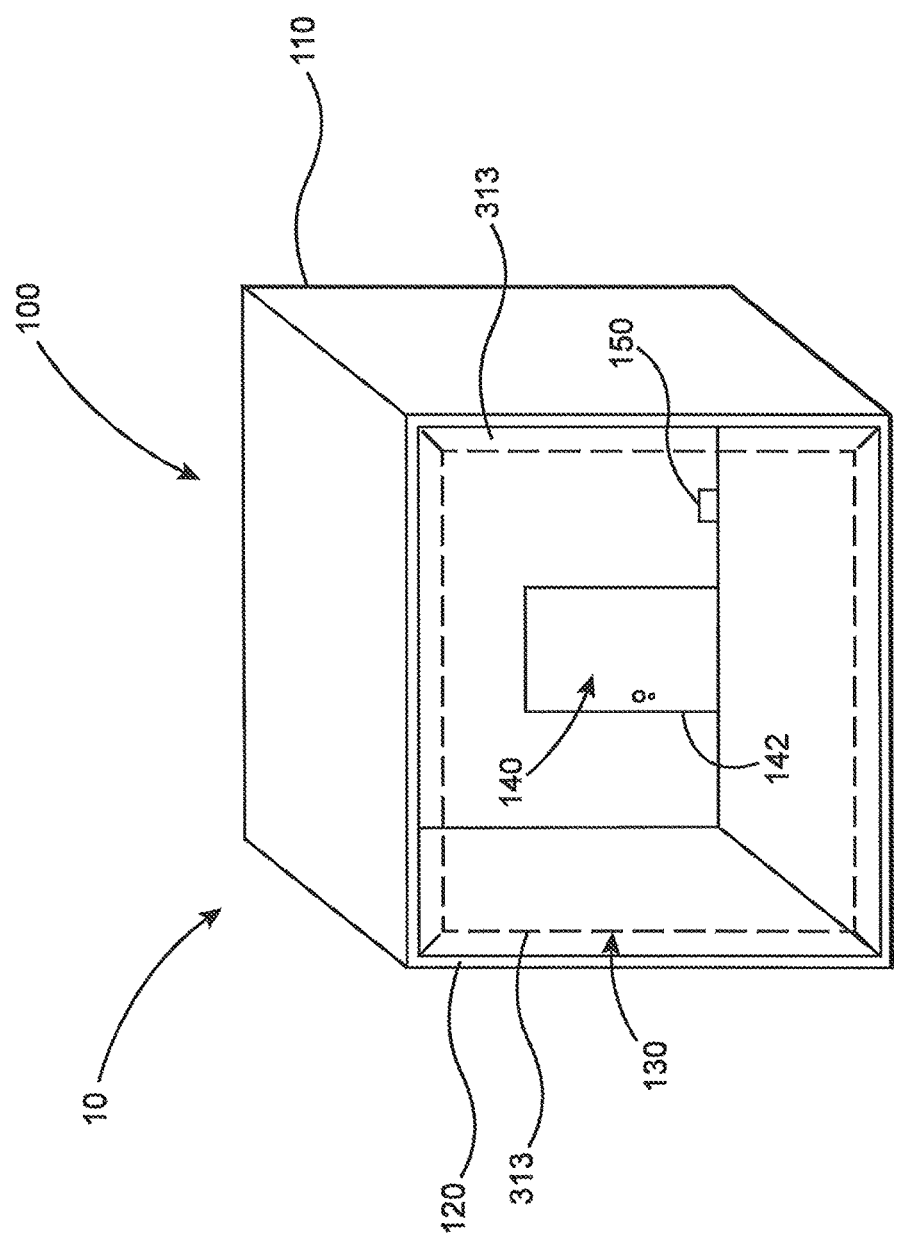
FIG. 1 is a front perspective view of a circulation chamber in accordance with one embodiment of the present invention.
Figure 2:
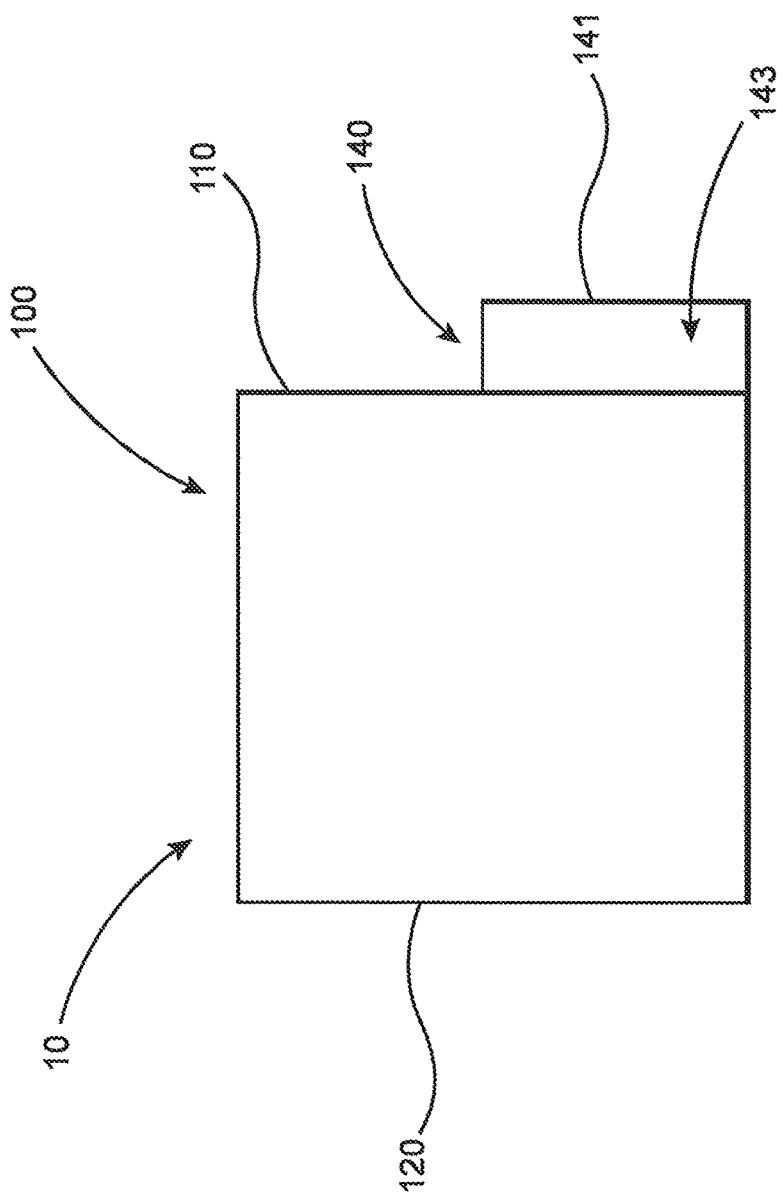
FIG. 2 is a side plan view of a circulation chamber in accordance with one embodiment of the present invention.
Figure 3:
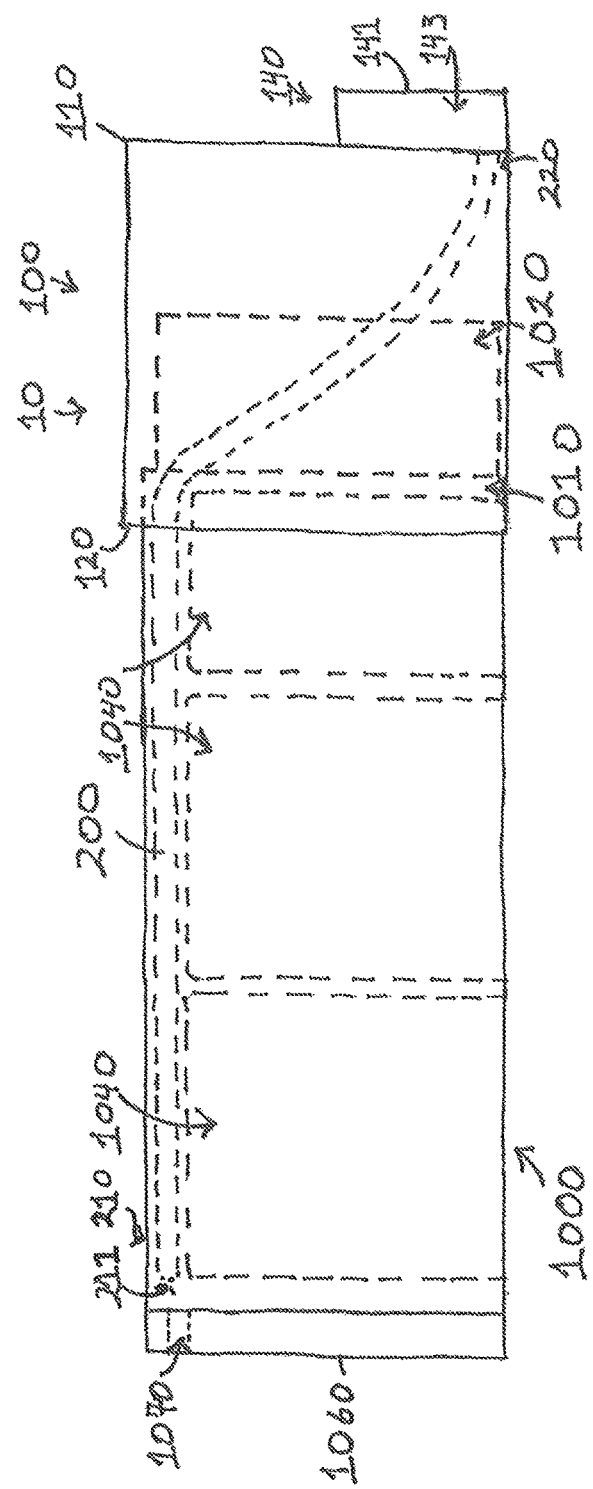
FIG. 3 is a side plan view of a circulation chamber attached to a refrigerated cargo container with a door of the cargo container open and an elongated conduit deployed in accordance with one embodiment of the present invention.
Figure 4:
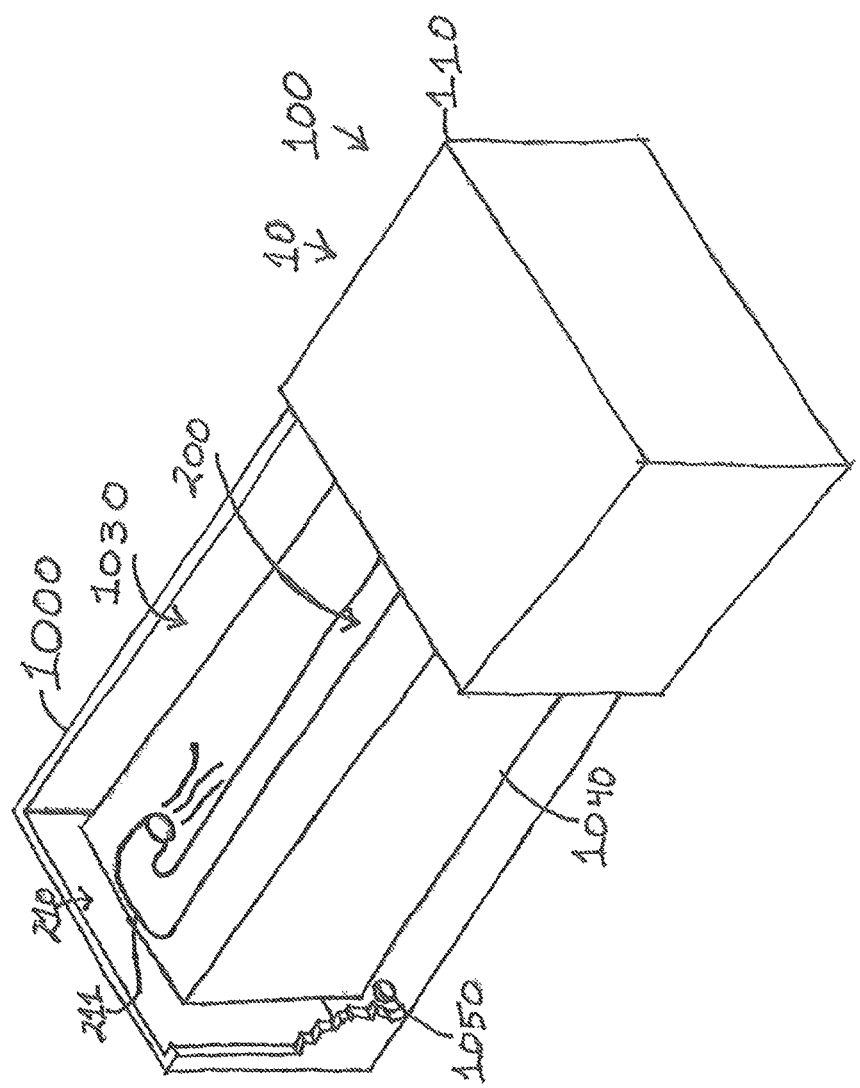
FIG. 4 is a perspective view of a circulation chamber attached to a partially cutaway cargo container, depicting the contents of the cargo container as well as an elongated conduit deployed in accordance with one embodiment of the present invention.
Figure 5:
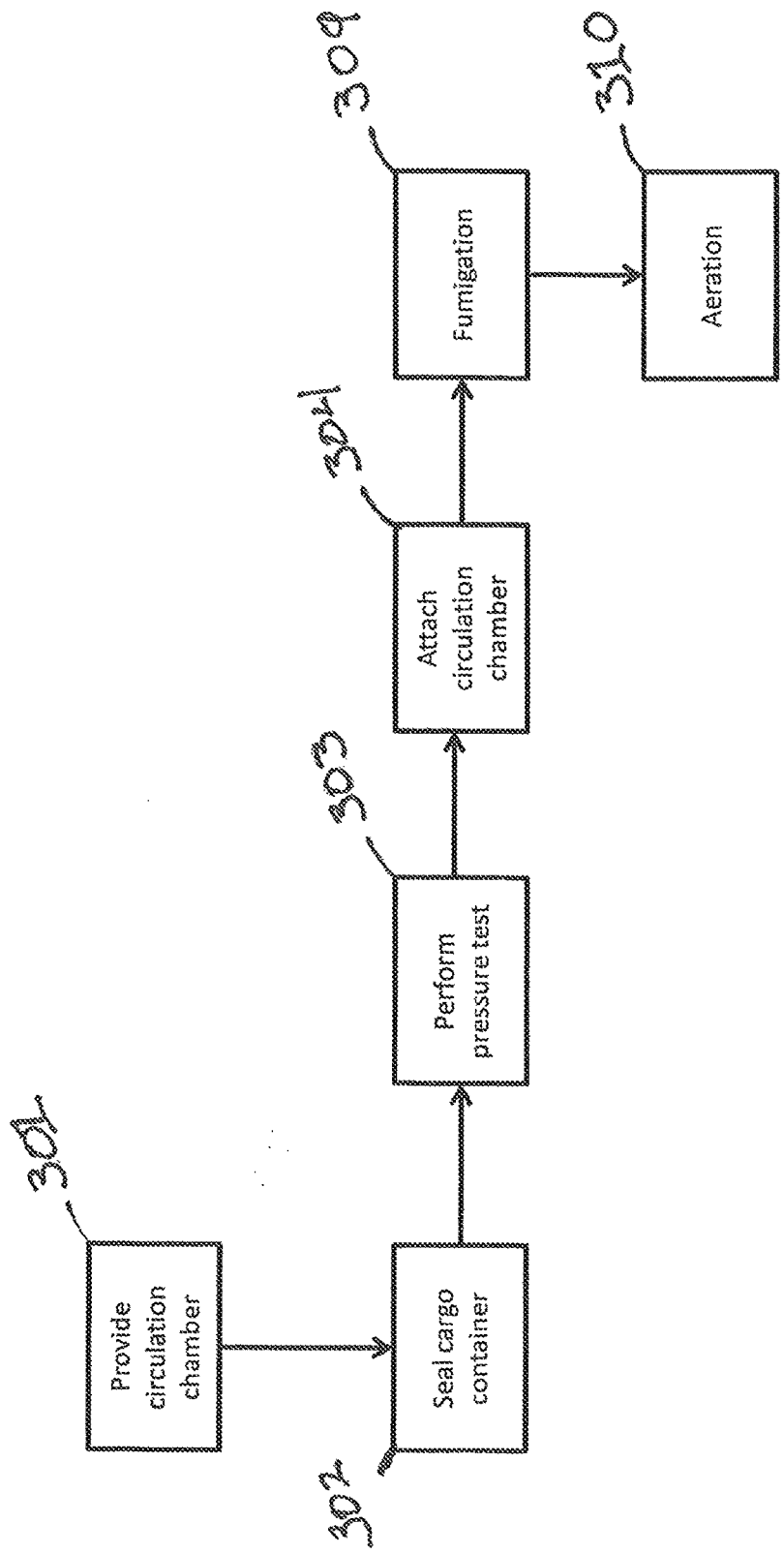
FIG. 5 is a schematic representation of a method of fumigating a cargo container in accordance with one embodiment of the present invention.
Figure 6:
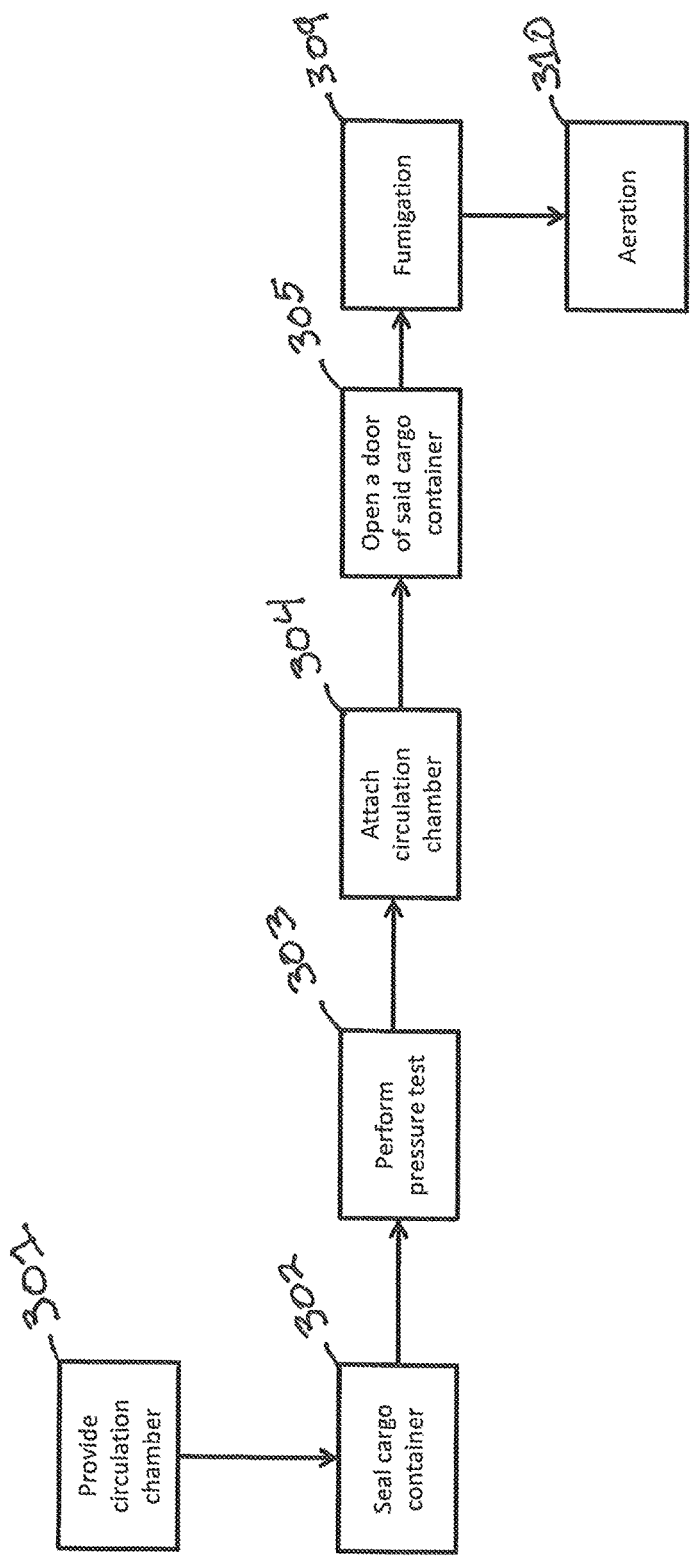
FIG. 6 is a schematic representation of a method of fumigating a cargo container in accordance with one embodiment of the present invention.

The invention is directed toward a circulation chamber 10 which provides several improvements in the field of "tarpless" or "in-container" fumigation. In at least one embodiment, the circulation chamber 10 is a cargo container extension 100 which supplements the volume of air in the cargo container 1000 for fumigation purposes. This embodiment may be accomplished by providing the cargo container extension 100 which includes at least a housing 110, at least one cargo container aperture 120, and an interior volume 130. In one embodiment, the housing 110 is constructed from materials that are substantially impermeable to gas, and is constructed with methods that result in a housing 110 that is substantially impermeable to gas. It is desirable that the housing 110 be substantially impermeable to gas because it will contain a portion of the fumigant during fumigation, and should not allow the fumigant to escape. In at least one embodiment the housing 110 is constructed of rigid materials and is substantially rectangular in shape, but may also be constructed, for example, from flexible materials attached to a rigid frame or be rounded in shape. The housing 110 may further contain one or more equipment ports 150 which allow the passage therethrough of a plurality of lines or other equipment necessary for carrying out the process of fumigating a cargo container. The equipment port 150 may be structured to simultaneously be substantially impermeable to gas while still allowing the passage therethrough of equipment or lines, or both. Those skilled in the art will appreciate that this can be accomplished in a variety of ways, including, but not limited to, the application of putty or foam, or installation of rubber gaskets, etc.

In one embodiment the housing 110 is substantially hollow providing an interior volume 130 therein. Generally, the interior volume 130 provides a supplemental volume of air to the cargo container 1000 during fumigation. This is generally accomplished by placing the interior volume 130 in fluid communication with the interior 1030 of the cargo container 1000 via a cargo container aperture 120 disposed on the housing 110. Moreover, it is also contemplated that in an alternate embodiment, multiple cargo container apertures 120 can be included in a single housing, each configured to engage a different cargo container 1000 in the manners described. In such an embodiment it is preferable that a larger interior volume 130 be defined in the housing 110 to create a larger supplement of air volume for fumigation.

In one embodiment the cargo container aperture 120 is structured and dimensioned to allow passage of a portion of a cargo container 1000 therethrough, allowing the cargo container 1000 to partially extend into the interior volume 130 of the housing 110. Alternately, part of the housing 110 at the cargo container aperture 120 can be disposed a small distance inside the cargo container 1000 or the housing 110 can directly abut the cargo container 1000. All of these arrangements facilitates a sealed engagement between the housing 110 and the cargo container 1000, such as by adhesives, clips, fasteners, tape, gaskets, putty, hook and loop fasteners, pressure or contact sealing and the like to create a sealed environment for fumigation of the contents 1040 of the cargo container 1000. In a further embodiment, the portion of the cargo container 1000 to engage and be in fluid communication with the cargo container aperture 120 is an end 1010 of a cargo container 1000 which includes at least one door 1020 of the cargo container 1000. The door 1020 of the cargo container 1000 may be opened before or after attaching the cargo container extension.

In at least one embodiment of the method of fumigating a cargo container 1000 disclosed further below, at least one door 1020 of the cargo container 1000 is opened only after it engages the housing 110, such as by abutting, overlapping or inserting the end 1010 of the cargo container 1000 at the cargo container aperture 120. A further embodiment includes opening at least one door 1020 after a fluid seal 313 is provided around the cargo container aperture 120, as represented in FIG. 1, to prevent the escape of gas therefrom. As noted, those skilled in the art will appreciate that such a fluid seal 313 can be accomplished through the application of a variety of putties, foams, gaskets, or even duct tape, regardless of whether the housing 100 and container overlap one another or simply abut one another. The benefits of this method and the provision of the fluid seal 313 are two-fold: it first reduces the risk of insects, pests, or other undesirable organisms from entering into the ambient environment, second, it more efficiently preserves the temperature of a refrigerated cargo container 1000 relative to a method that involves opening a door 1020 of the cargo container 1000 and exposing the air inside to ambient air.

Accordingly, in an embodiment of the method wherein a door 1020 of the cargo container 1000 is opened only after engagement of the end 1010 of the cargo container 1000 at the cargo container aperture 120, the housing 110 must be dimensioned to allow clearance for the opening, at least partially, of a door 1020 therein. Similarly, an access port 140 must be provided on the housing 110, to provide ingress and egress to and from the interior volume 130. Such an access port 140 is desirable to allow operators access to the cargo container 1000 after the circulation chamber 100 has been attached. In at least one embodiment, the access port 140 is structured and dimensioned to allow ingress and egress to and from the interior volume 130, but without allowing a substantial amount of ambient air to enter the interior volume 130. At least one further embodiment is structured and dimensioned to allow ingress and egress to and from the interior volume 130, but without allowing refrigerated air and/or pests, insects, or other undesirable organisms to escape therefrom.

In at least one embodiment, the access port 140 includes an exterior hatch 141, disposed exteriorly of the housing 110, and interior hatch 142, disposed interiorly of the housing 110, and an air chamber 143 disposed therebetween. In a further embodiment both the exterior and interior hatches 141 and 142 are constructed to provide a substantially air tight seal when closed. Thus an operator may open the exterior hatch 141 without exposing the interior volume 130 to ambient conditions with the interior hatch 142 closed, and the operator may open the interior hatch 142 without exposing the interior volume 130 to ambient conditions with the exterior hatch 141 closed.

In a further one embodiment of the method of fumigating a cargo container 1000 disclosed further below, an elongated conduit 200 is provided to facilitate the circulation of gas inside the cargo container 1000. Because the circulation chamber 10 allows shippers to pack more cargo into cargo containers, there is less air space inside the cargo container 1000. Thus, it may be necessary to provide and elongated conduit 200 which can direct gas to desired locations within the cargo container 1000, in order to ensure proper fumigation.

The elongated conduit 200 may be rigid, semi-rigid, or flexible, and may be as long, or longer, than the cargo container 1000 to be fumigated. In at least one embodiment, the elongated conduit 200 is structured and dimensioned to be laid along the top of the contents 1040 of the cargo container 1000, and extend along the length of the cargo container 1000. In yet another embodiment, the elongated conduit 200 may be passed underneath the contents 1040 of the cargo container 1000, or wedged between the contents 1040 of the cargo container 1000 and an interior wall of the cargo container 1000.

Figure 7:
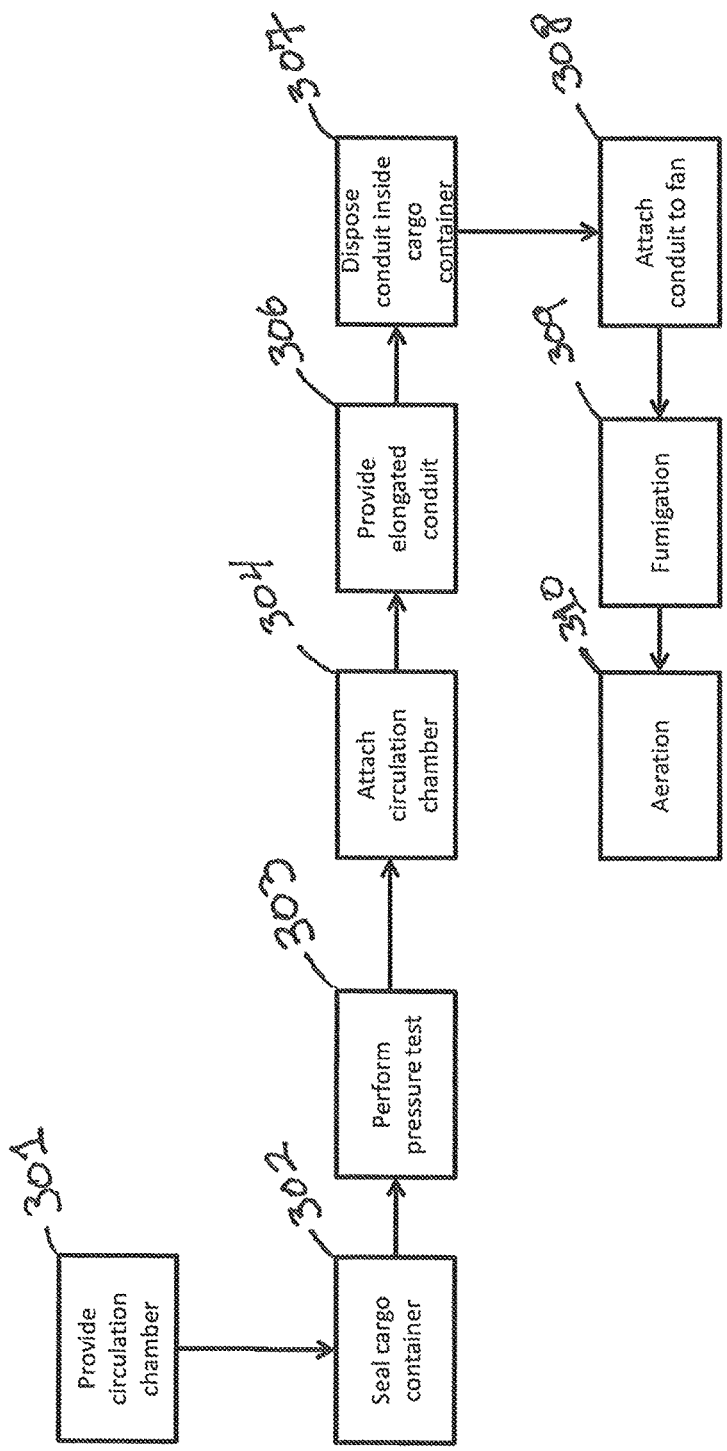
FIG. 7 is a schematic representation of a method of fumigating a cargo container in accordance with one embodiment of the present invention.
Figure 8:
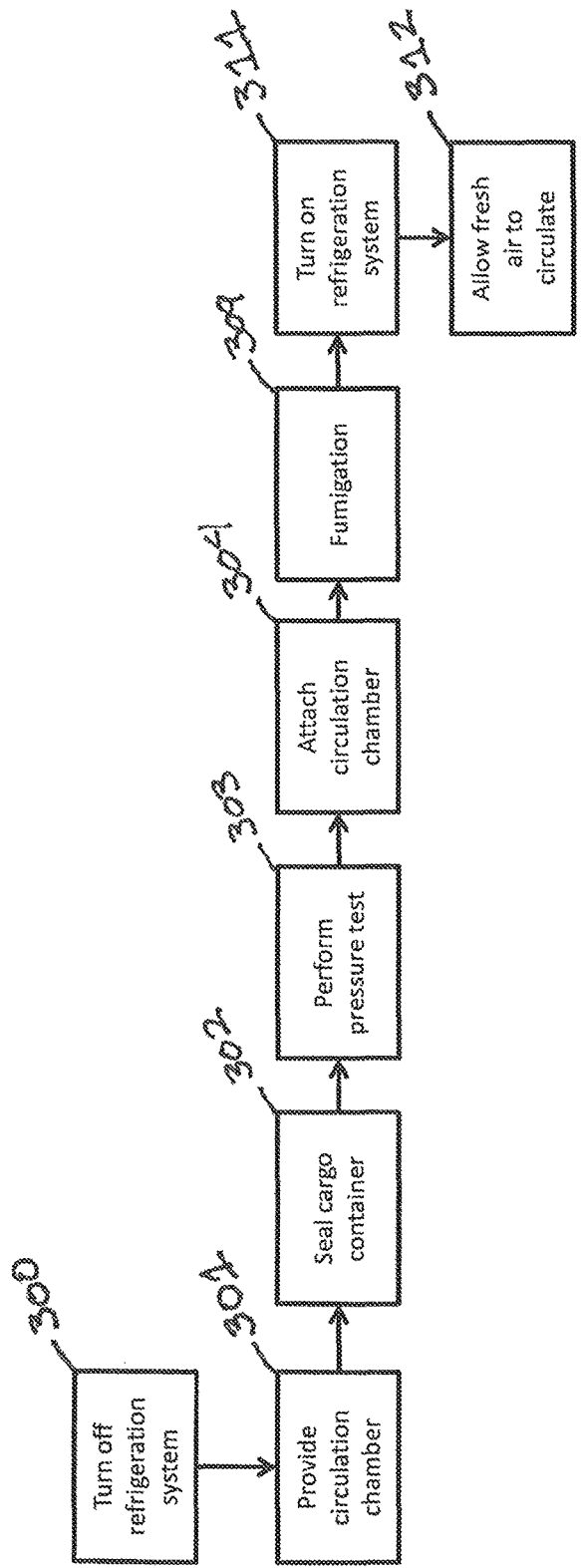
FIG. 8 is a schematic representation of a method of fumigating a cargo container in accordance with one embodiment of the present invention.
Figure 10:
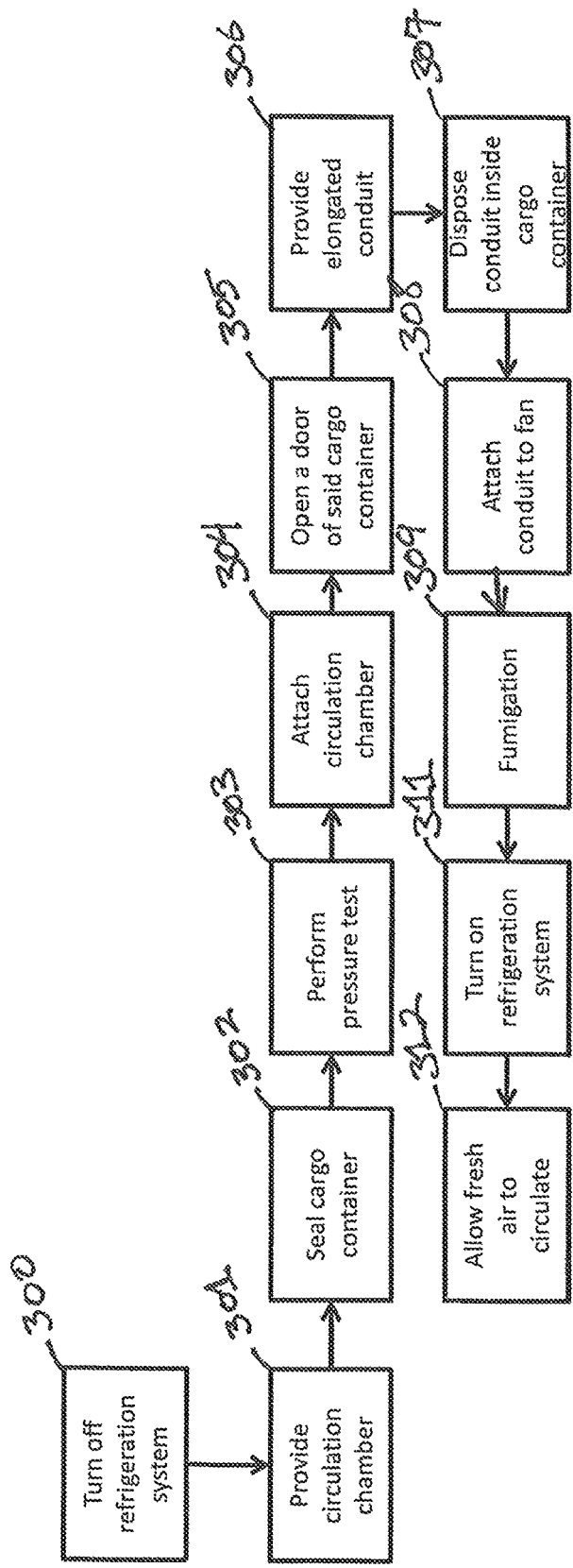
FIG. 10 is a schematic representation of a method of fumigating a cargo container in accordance with one embodiment of the present invention.

In a further embodiment, the elongated conduit 200 may have a distal curve 211, or be otherwise appropriately configured, at the distal end 210, or along one or more portions of the length thereof, to facilitate the passage and delivery of air or fumigating gas over or around certain contents 1040 as desired. Generally the proximal end 220 is connected to a fan or blower 308, as described in the embodiments of FIGS. 7 and 10, in order to facilitate the passage of gas through the elongated conduit 200. But the fan or blower 308 may also be connected at the distal end 210. Thus, the elongated conduit 200 may be used to facilitate both the fumigation and circulation steps, as disclosed below, depending upon whether fumigant or fresh air is passed through the elongated conduit 200.

The invention is also directed toward a method of fumigating the contents 1040 of a cargo container 1000. In one embodiment, the method includes providing a circulation chamber 100 which provides a volume of air for circulation inside the cargo container 1000 during fumigation.

In at least one embodiment, the method includes the step of sealing the cargo container 302. This step can be accomplished in various ways, depending on the specification of the cargo container 1000 to be fumigated. As a non-limiting example, sealing the cargo container 302 may include first visually inspecting the cargo container 1000 for damage that could cause a leak. If such damage is found, the damage should be sealed, at least temporarily, before commencing the fumigation step. Then any drain holes 1050 may be plugged. Also, if the cargo container 1000 contains a refrigeration system 1060, and the refrigeration system 1060 contains an air exchanger 1070, the air exchanger 1070 should be closed or otherwise sealed. This step may also include inspecting any fabricated seals such as plugs, welds, and application of adhesives.

In a further embodiment, the method includes the step of performing a pressure test 303 on the cargo container 1000 to be fumigated. Those skilled in the art will appreciate that this step can comprise any of a plurality of methods for ascertaining whether the cargo container 1000 to be fumigated is structurally sound to contain fumigant gas during a fumigation 309 step, without allowing a predetermined amount of fumigant gas to escape therefrom. One such method may include pressurizing the interior 1030 of a cargo container 1000 and then inspecting the cargo container 1000 for leaks. Inspection may be facilitated with visual indicia or with the assistance of specialized equipment, such as a gas or halide detector, for example. It will be understood to those skilled in the art that the step of performing a pressure test 303 is not strictly necessary, but may be desired in certain circumstances. Accordingly, the scope of the invention is not to be understood to require the step of performing a pressure test 303 on a cargo container 1000.

In a further embodiment the method includes the step of fumigating the contents 309 of the cargo container 1000, once the circulation chamber 10 is attached, as at 304, to the cargo container 1000. This includes any of several preparatory steps which must be carried out prior to introducing a fumigant into the cargo container 1000. For example, the step can include introducing gas introduction hoses or lines [not depicted] into the cargo container 1000, which may be introduced via any of the drain holes 1050 or equipment ports 150. Alternatively, the gas introduction hoses may be contained within the circulation chamber 10 and introduced into the cargo container 1000 via the door 1020 opening. In the same vein, it may be necessary to introduce reading lines [not depicted], for taking measurements of the fumigant concentration within the cargo container 1000, as well as electrical lines [not depicted] for powering any of a plurality of equipment such as fans, blowers, and/or lights disposed in the cargo container 1000 or in the circulation chamber 10. Likewise, the reading lines and electrical lines may also be contained within the circulation chamber 10 and introduced into the cargo container 1000 via the door 1020 opening, as necessary. Alternatively the reading lines and electrical lines may be introduced through any of the drain holes 1050 or equipment ports 150. Further preparation may also include the placement of one or more fans [not depicted] within the cargo container 1000 or circulation chamber 10 to promote circulation of air therein, as well as other methods known in the art.

Figure 9:
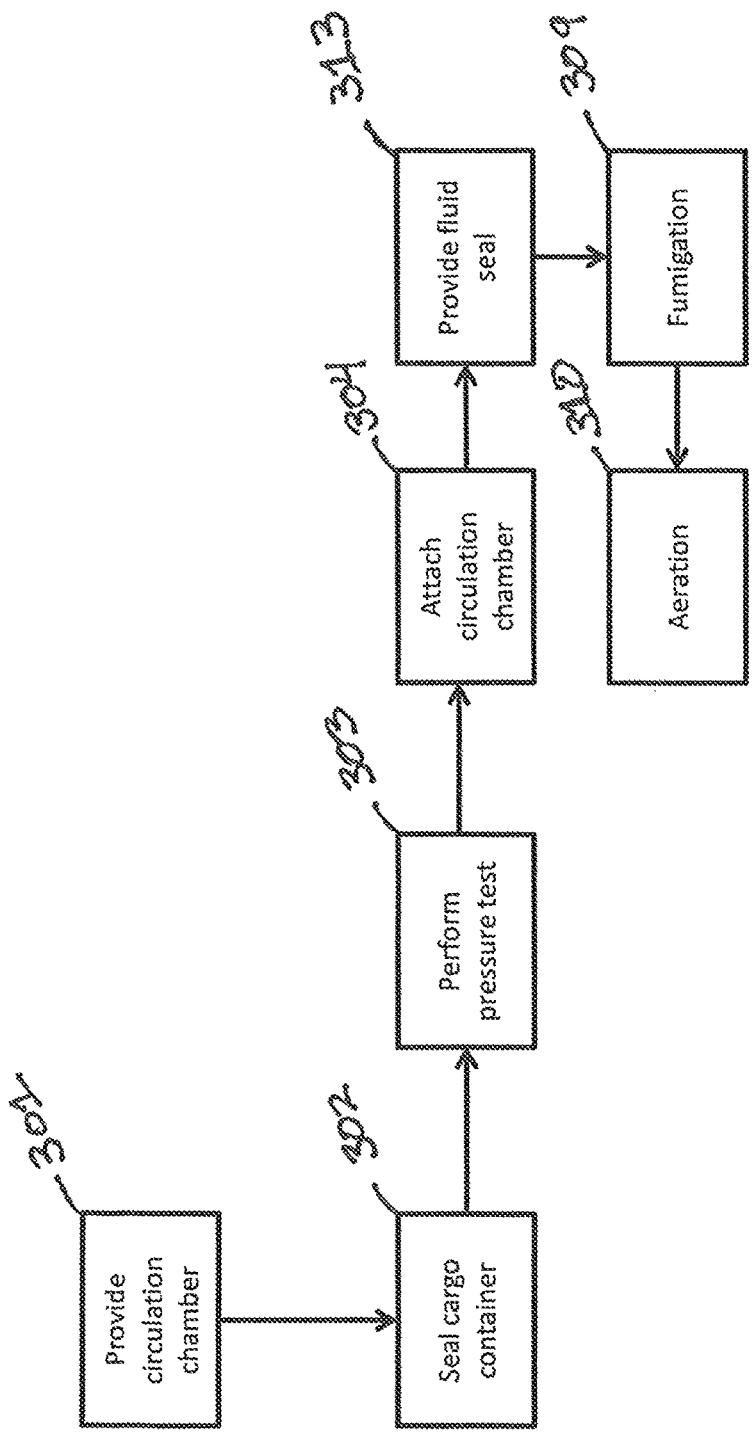
FIG. 9 is a schematic representation of a method of fumigating a cargo container in accordance with one embodiment of the present invention.

As a further preparatory step, it may be desirable to provide a fluid seal 313 (see FIG. 9) between the cargo container 1000 and the circulation chamber 10. Those skilled in the art will appreciate that this can be accomplished with a variety of methods, including, but not limited to, providing putty, foams, rubber gaskets, and even duct tape, to seal the circulation chamber 10 to the cargo container 1000.

The step of fumigating the contents 309, after the preparatory steps are performed, may then include checking the temperature of the air inside the cargo container 1000 and/or the contents 1040 of the cargo container 1000 to be fumigated. Then, the step of fumigating the contents 309 generally involves releasing a fumigant into the container and monitoring the concentration of fumigant via the reading lines for a specified period of time. Should the concentration of fumigant fall below the desired level, more fumigant may be added. Furthermore, it may be desirable to continually monitor the environment immediately surrounding the cargo container 1000 with a gas or halide detector [not depicted], to detect any leaks. If leaks are detected, then it will be desirable to seal the leaks, and re-check the area surrounding the now sealed leak with a gas or halide detector. Those skilled in the art will appreciate that, under certain circumstances, it may not be desirable to seal a leak and thus, the leak will not be sealed in such a scenario.

In at least one embodiment of the fumigation step 309, the cargo container 1000 includes a refrigeration system 1060 and the refrigeration system 1060 is allowed to run during fumigation. This method takes advantage of the existing fans and other various air circulation equipment built in to the cargo container 1000 to circulate fumigant within the cargo container 1000.

Lastly, the method calls for a step of aerating the cargo container 310, which generally includes circulating fresh air 312 inside the now fumigated cargo container 1000, while simultaneously releasing and/or diluting the fumigant inside the cargo container 1000, until the fumigant concentration reaches, at least, a safe level. This step may be accomplished by unsealing the various drains and/or vents on the container and allowing fresh air to enter the container therefrom. In at least one embodiment, the cargo container 1000 includes a refrigeration system 1060 and the refrigeration system 1060 includes an air exchanger 1070. In this embodiment, fresh air may be allowed to enter through the air exchanger 1070.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A circulation chamber for a cargo container comprising:
   a cargo container extension including a housing, a cargo container aperture, and an interior volume;
   said cargo container aperture structured and dimensioned to be attached to and engage an opening of the cargo container therethrough, said interior volume disposed in fluid communication with an interior of the cargo container,
   an elongated conduit structured to contain and pass a gas along the length thereof;
   said elongated conduit extending through said cargo container aperture into the cargo container to direct gas to a desired location within the cargo container and into fluid communicating relation between said interior volume and the interior of the cargo container, and
   said cargo container aperture and said interior volume collectively structured and dimensioned to allow an opening of at least one door of the cargo container, concurrent to disposition of the cargo container in engagement with said cargo container aperture and into fluid communication with said interior volume.

2. The circulation chamber as recited in claim 1 further comprising an access port disposed on said housing allowing ingress and egress, of an operator, to and from said interior volume.

3. The circulation chamber as recited in claim 2 wherein said access port further comprises an exterior hatch disposed exteriorly of said housing, an interior hatch disposed interiorly of said housing, and an air chamber disposed therebetween.

4. The circulation chamber as recited in claim 1 wherein said elongated conduit has sufficient longitudinal dimension to extend along at least a majority of a length of the interior of the cargo container.

5. The circulation chamber as recited in claim 4 wherein said elongated conduit is structured and movably disposed to carry gas from said interior volume to predetermined portions of the interior of the cargo container.

6. The circulation chamber as recited in claim 5 wherein said elongated conduit further includes a curve at a distal end.

7. The circulation chamber as recited in claim 5 wherein said elongated conduit is open at a distal end.

8. The circulation chamber as recited in claim 5 wherein the gas is air.

9. The circulation chamber as recited in claim 5 wherein the gas is fumigant.

10. The circulation chamber as recited in claim 1 wherein said interior volume comprises at least 20% of a volume of the cargo container.

11. The circulation chamber as recited in claim 1 further comprising at least one equipment port disposed on said housing and configured and dimensioned to allow the passage therethrough of equipment or lines, or both equipment and lines, into said interior volume.

12. The circulation chamber recited in claim 1 further structured to attach to and engage the opening of at least two cargo containers.

13. The circulation chamber recited in claim 12 further comprising at least two of said cargo container apertures, each structured to attach to and engage the opening of a different one of the at least two cargo containers.

14. A circulation chamber for a cargo container comprising:
   a cargo container extension including a housing dimensioned and structured to be connected to at least one cargo container,
   said housing comprising a cargo container aperture and an interior volume,
   said cargo container aperture structured and dimensioned to be attached to a portion of the cargo container,
   said interior volume disposed and dimensioned to engage an opening of the portion of the cargo container,
   said interior volume disposed in direct fluid communication with an interior of the cargo container concurrent to disposition of the portion of cargo container in engagement with said cargo container aperture,
   a fluid seal connected to said cargo container aperture; said fluid seal disposed in sealing relation with the cargo container concurrent to disposition of the portion of cargo container in engagement with said cargo container aperture and said interior volume; and
   an elongate conduit structured to extend into the cargo container and direct gas to a desired location within the cargo container, said elongate conduit in fluid delivering communication with said interior volume and the interior of the cargo container.

* * * * *